Feb. 23, 1937. J. W. DEWS 2,071,507
METHOD OF APPLYING FASTENERS TO SHEET LIKE MATERIAL
Original Filed April 29, 1935
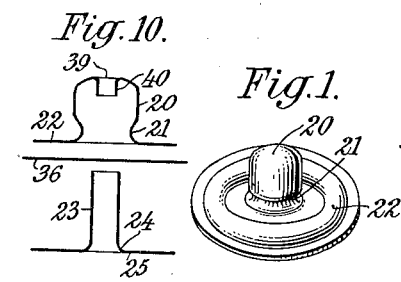
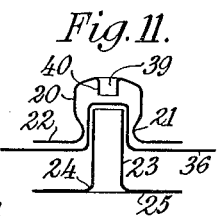
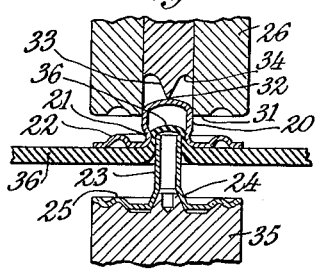
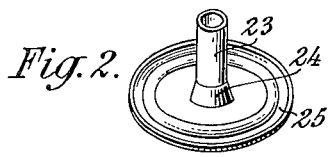
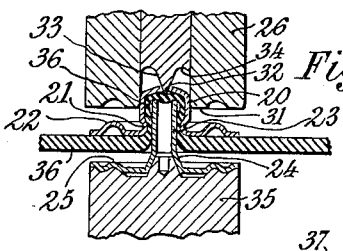
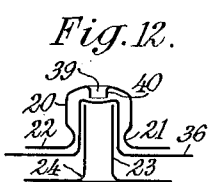
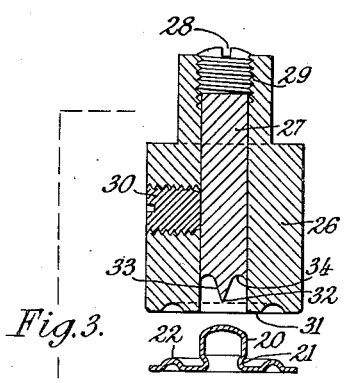
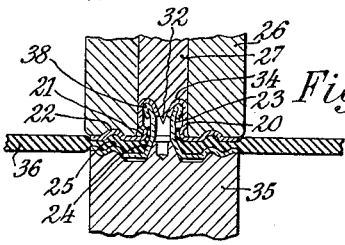
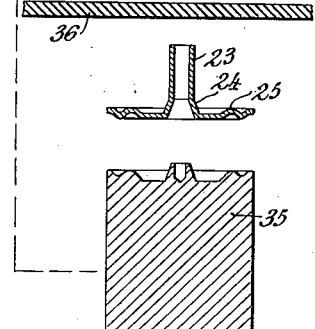
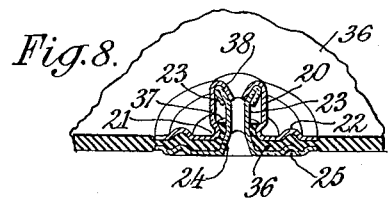
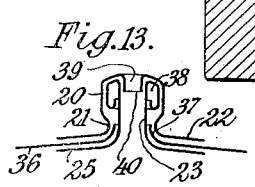
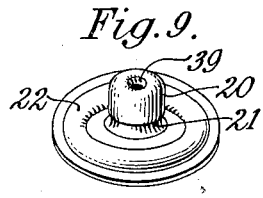
INVENTOR
Joseph W. Dews,
BY
Fraser, Myers and Newly
ATTORNEYS.

Patented Feb. 23, 1937 2,071,507

UNITED STATES PATENT OFFICE 2,071,507

METHOD OF APPLYING FASTENERS TO SHEET LIKE MATERIAL

Joseph W. Dews, Waterbury, Conn., assignor to Scovill Manufacturing Company, a corporation of Connecticut Original application April 29, 1935, Serial No. 18,824. Divided and this application May 13, 1936, Serial No. 79,539

3 Claims. (Cl. 218—29)

This invention relates to improvements in methods of applying fastening devices to garments, or other materials, of which they are intended to form parts, and is a division of my copending application Serial No. 18,824, filed April 29, 1935. Although such methods may be used with a wide variety of fasteners, and may be carried out by any one of a wide variety of tools, the novel features of the invention are particularly designed for use in making and securing garment fasteners to articles of wearing apparel, and are herein disclosed in connection with the application of the stud element of a snap fastener of the ball and socket type to a sheet of rubber or equivalent elastic material.

When utilizing the method of the present invention for applying fastener elements to garments or the like, the parts of the fastener need comprise nothing more than a pair of loosely telescoping flanged elements which may, as a matter of convenience, be referred to respectively as a stud and an eyelet. The stud-entering end of the eyelet need not be sharpened and should be of a diameter somewhat smaller than the opening in the stud, so that when the stud and eyelet are telescoped one within the other, with the elastic sheet material between them, the part of the sheet material immediately overlying the entering end of the eyelet will be stretched and thrust into the opening in the stud, the loose fit between the eyelet and the stud being such as to afford ample space for the elastic material to enter. When the eyelet has been forced into the stud to such a degree that its open entering end is approaching the under side of the dome of the stud, the elastic material which is stretched over the entering end is pierced. The latter may be accomplished by means of a piercing tool, or, if desired, the dome of the stud may be so designed as to effect this result. In any event, the stretched rubber, after being pierced, extends around the perforation and is drawn backwardly towards the base of the eyelet so as to relieve the strain on the rubber and leave a large portion of the inserted end of the eyelet bare. The stud and the eyelet may then be pressed between appropriate anvils, one of which engages the stud, and the other of which engages the base of the eyelet so as to cause the inserted end of the eyelet to be rolled outwardly around the flaring walls of the mandrel into a clinching engagement with the surrounding portion of the stud which is nested within a recess in the part of the anvil which surrounds the mandrel. By thus forcing the eyelet into the stud and rolling its end into engaging relation with the inner part of the head of the stud, the flanges of the stud and eyelet may be brought into a close engaging relationship with the sheet material immediately surrounding the inserted part of the eyelet, which will have been relieved from anything in the nature of excessive strain and restored to approximately normal condition after being perforated and before being clamped between the flanges of the stud and eyelet so as to lie flat and smooth without any puckers or wrinkles after the fastener has been applied.

The attached fastener as applied to the article on which it is to be used differs from known constructions of the prior art in that the elastic material, although no part of it has been cut out and removed, is drawn clear of the portion of the eyelet which is rolled into an engaging relation with the inner wall of the stud, and although clamped between the flanges of the stud and eyelet, the edge portion which surrounds the eyelet has no tendency to expand the walls of the protuberant portion of the stud at its base since the designed loose fit between the stud and the eyelet is such as to provide space for the entrance of the stretched rubber when the eyelet is first thrust into the stud and for the withdrawal of the rubber surrounding the eyelet after it has been perforated by the setting tool.

In the accompanying drawing illustrating a preferred form of the invention,—

Figure 1 is a perspective view of a conventional form of snap fastener stud.

Fig. 2 is a conventional form of eyelet which might be used in securing the stud of Fig. 1 to a part of a rubber garment or other article of sheet material. These two parts need not differ from those commonly used in the prior art other than that the portion of the eyelet intended to enter the opening in the back of the stud should be of slightly smaller diameter than would ordinarily be used in order to allow the sheet material to enter and be withdrawn.

Fig. 3 is an axial cross-sectional view through a stud, an eyelet, a sheet of material to which the stud and eyelet are to be applied, a conventional form of anvil to be used in inserting the eyelet, and a setting tool for the stud comprising a pointed mandrel and anvil embodying the hereindisclosed invention.

Figs. 4, 5, 6 and 7 are similar cross-sectional views of the parts illustrated in Fig. 3, such parts being represented in different positions to which they are successively moved when applying the stud and eyelet to the intervening sheet of elastic material.

Fig. 8 is a view, partly in axial cross section and partly in perspective, representing a snap fastener stud and eyelet secured to a sheet of elastic material.

Fig. 9 is a perspective view of a modified form of fastener stud which may be used in practicing the invention.

Fig. 10 is a diagrammatic cross-sectional view of another modified form of the invention, the parts illustrated representing a fastener stud, eyelet and an intervening piece of sheet material, the stud having a piercing element extending downwardly from its inner upper surface.

Fig. 11 is a similar view of the same parts, the end of the eyelet being represented as having been thrust into the stud and as having stretched a part of the sheet material over its upper end.

Fig. 12 is a similar view of the same fastener parts, the eyelet being represented as having been thrust farther into the stud to a position such that further movement will cause the sheet material to be punctured.

Fig. 13 is a similar view of the same elements, the fastener parts being represented as having been secured to the sheet material.

As has already been explained, the stud illustrated by Fig. 1 is of conventional form comprising the usual head 20, neck 21 and flange 22. Likewise, the eyelet may be of conventional form comprising a hollow cylindrical post 23, base 24 and flange 25.

The setting tool for the stud in accordance with the method of the present invention, as best illustrated in Fig. 3, may comprise a body portion 26 and a core 27 telescoped one within the other. The core may be adjustably secured within the body portion in any appropriate manner with its lower end slightly above the lower end of the body portion. In the form of the invention herein disclosed the upper end of the core 27 is slotted as at 28 and has threaded engagement as at 29 with the inner wall of the body portion so that by the use of an ordinary screw-driver, the position of the core within the body portion may be readily adjusted, and, if desired, the core may be held in any such position of adjustment, in any suitable manner, as by the use of a set-screw 30 in the body portion having its end so positioned that it may be forced into clamping engagement with the surface of the core.

The lower working face 31 of the body portion of the setting tool should be of a form such as to serve as an anvil for the flange of the stud, and the opening in the body portion of the tool which receives the core 27 should be of a diameter such that its lower end may serve as a recess of a size adapted to receive the head of the stud.

At the center of the lower end of the core is a part which may be properly referred to as a mandrel, having a pointed end as at 32 and an outwardly flaring wall 33 of substantially conical form merging into an annular curved surface 34 which serves as an anvil for the head of a fastener stud during a setting operation.

The anvil 35 should have an upper working surface adapted to conform with that of the base of the eyelet to be used in securing the stud to an intervening sheet of rubber or other elastic material 36.

The stud and eyelet illustrated in Fig. 3 may be secured to the sheet material 36 by the use of any appropriate machine (not shown) adapted to force the setting tool 26, 27 and anvil 35 towards each other. Machines operated by hand power, foot power, and what are known as automatic machines, adapted for use in thus securing fastener parts to sheet material are well known in the prior art and need not be herein specifically disclosed.

The approximate relative movements of the parts of the fastener elements and setting tools during a setting operation are illustrated in Figs. 4 to 7, inclusive, it being understood, of course, that the relative degree of movement of the different parts with respect to one another may vary to some extent and might not exactly conform with the conventional representation in the various figures of the drawing. In Fig. 4 the stud is represented as having been moved into the recess in the lower part of the setting tool with the center of its head in contact with the perforating point 32. In the same view the upper end of the eyelet is represented as having engaged and stretched the overlying part of the sheet of elastic material 36 and forced it into the opening in the base of the stud. In Fig. 5 the eyelet is represented as having forced the stretched overlying elastic material to a position quite close to the under surface of the head of the stud, and the perforating point of the setting tool is represented as having been thrust through the wall of the head of the stud to a position in which it is in readiness to perforate the underlying portion of the sheet of elastic material. In Fig. 6 the elastic material is represented as having been perforated and the edges of the portion surrounding the perforation are represented as having been stretched outwardly sufficiently to snap down towards the base of the eyelet to the positions indicated at 37. Fig. 6. In this figure the eyelet is represented as having been thrust upwardly to a position such that its entering end surrounding the flaring wall 33 of the mandrel has been rolled over after making contact with the under surface of the head of the stud, the flange 25 of the eyelet and the flange 22 of the stud approaching the positions in which they will clamp the elastic material 36 between them.

In Fig. 7 the setting operation is indicated as having been completed. The upper end of the eyelet and the adjacent portion of the head of the stud are represented at 38 as having been rolled into a clinching engagement with each other by the flaring wall 33 of the mandrel and surrounding wall 34 of the core 27 of the tool. The flanges 22, 25 of the stud and eyelet are also represented as having been pressed into clamping engagement with the portion of the sheet of elastic material 36 surrounding the part through which the post of the eyelet has been inserted.

Fig. 8 represents the stud and eyelet as having been attached to the sheet of elastic material and the setting tools withdrawn. It will be apparent that since the stretched portion of the sheet of elastic material has been perforated and permitted to expand and slip down towards the base of the eyelet, there will be no layer of intervening elastic material to interfere with the satisfactory clinching of the upper end of the eyelet in the head of the stud, and since the annular space between the post of the eyelet and the inner wall of the stud is such as to provide for a free movement of the stretched elastic material, the part of the elastic material to which the fastener elements are secured is permitted to return to a substantially normal condition before it is clamped between the flanges 22, 25 of the stud and eyelet, thus avoiding any wrinkling of the surrounding material.

In Figs. 3 to 7, inclusive, the stud is represented as one having an imperforate head which is perforated by the point 32 of the setting tool during a setting operation. In Fig. 9 is illustrated a modified form of stud having a centrally-disposed perforation 39 in its head through which the point 32 of the setting tool may enter and then perforate the underlying elastic material to which the stud is to be secured. The perforation may be made with an ordinary drift-pin, and, if desired, the knurled burr may be removed before securing the stud to the article on which it is to be used. When using this preperforated form of fastener element it may be immediately thrust to a seated position in the recess in the setting tool, that is, to the position indicated in Fig. 6, at the initial stage of the setting operation, illustrated by Fig. 4, with the point 32 of the mandrel extended through the perforation in the fastener element in readiness to perforate the elastic material when forced against it by the upper end of the eyelet as it is moved towards the position in which it is illustrated in Fig. 6.

The stud and eyelet or other fastening elements to which the invention is applied may be made of any appropriate metal or alloy. If used on rubber, aluminum or some other non-copper content metal would serve as a satisfactory material for the fastener elements.

As already explained, the perforated fastener of the character of the one illustrated by Fig. 9 may be applied to the sheet material, on which it is to be used, with the aid of the tool illustrated in Fig. 3, whether or not the inturned burr of metal surrounding the perforation 39 has been removed. If the burr is permitted to remain, the form and dimensions of the mandrel may be such that the point 32 will extend below the burr and serve as a means of perforating the underlying sheet material during a fastening operation before the sheet material is brought into contact with the burr.

As distinguished from the form in which the invention has been presented by Figs. 1 to 9, inclusive, and the description thereof, Figs. 10 to 13, inclusive, illustrate in diagram a modified form in accordance with which the head of the fastener element represented as a stud has a portion of the fastener wall surrounding a centrally-disposed perforation in the head of the stud extended downwardly so that it may serve as a means of puncturing sheet material when thrust into contact therewith and not be dependent upon the use of a setting tool having a pointed puncturing element to be thrust through the perforation.

In Fig. 10 is represented in diagram a stud having a head 20, neck 21, flange 22 and perforation 39, conforming with the stud illustrated by Fig. 9. There is also represented in Fig. 10 an eyelet having a post 23, base 24 and flange 25, similar to the one illustrated by Fig. 2. 36 of the diagram is representative of a piece of sheet material to which the stud and eyelet may be secured.

The stud illustrated in Fig. 10 is represented as having a portion of the metal wall of the fastener immediately surrounding the perforation 39 turned inwardly so as to form a downwardly-extending tubular projection 40, which might comprise the burr which would result from the use of an ordinary drift-pin as the means of perforating the head of the stud, or the extension 40 might be formed in any other appropriate manner. As will be shown, this burr or equivalent inwardly and downwardly extended tubular portion of the fastener may serve as a means of puncturing elastic sheet material when thrust into the fastener element by an eyelet during the operation of securing parts of the fastener to the material on which they are to be used.

In Fig. 11 the end of the eyelet post is represented as having been caused to stretch the overlying portion of the sheet material 36 and as having thrust a portion of the material into the hollow portion of the stud.

In Fig. 12 the post 23 of the eyelet is represented as having been thrust farther into the hollow part of the stud and the overlying stretched portion of the sheet material is represented as having been brought into contact with the edge portion of the extension 40, so that further movement of the post will cause the stretched sheet material to be punctured.

In Fig. 13 the parts represented in Figs. 10, 11 and 12 are illustrated as having been firmly secured together. It will be understood that the puncturing of the stretched elastic material overlying the end of the post, by a slight advance movement of the post from the position represented in Fig. 12, will cause the punctured elastic material to slip over and down the wall of the post to a position near the base as represented at 37, Fig. 13. Following this puncturing of the stretched elastic material and the drawing away of the material from the upper part of the post of the eyelet, further telescoping movement of the stud and eyelet causes the upper end of the post to be rolled outwardly about the tubular extension 40 and downwardly along the inner walls of the head of the stud to a clinching engagement with the stud head, as indicated at 38 in Fig. 13.

The puncturing of the stretched elastic material so as to permit the portion distorted by thrusting the post into the stud to be relieved of strain, and to permit the parts surrounding the post of the eyelet to be restored substantially to their normal condition before moving the flanges 22 and 25 of the stud and eyelet from the positions represented in Fig. 12 to the clamping position represented in Fig. 13, tends to prevent the wrinkling or puckering of the sheet material surrounding the attached parts of the fastening element.

The methods of the present invention are not intended to be limited to the precise steps herein described, nor to use with the exact forms of fasteners and tools herein illustrated, but should be regarded as including modifications and variations within the scope of the appended claims.

What I claim is:

1. The method of securing a pair of fastener elements, of dimensions and forms such that they may be loosely telescoped one within the other, to elastic sheet material, which consists in inserting one element in the opening in the other with the elastic material between them, thus causing the material overlying and closely surrounding the end of the inserted element to be stretched and forced into the other, puncturing the stretched elastic material underlying the exposed end of the outer element so as to permit the part surrounding the puncture to be drawn back away from the inserted end of the inner element towards the plane of the surrounding body portion of the sheet material, and securing the two fastener elements together by pressing them towards each other in an axial direction between a pair of anvils so as to thrust the inserted element further into the outer element and thus cause the inserted end to be rolled into a clinching engagement therewith.

2. The method of securing a pair of fastener elements, of dimensions and forms such that they may be loosely telescoped one within the other, to elastic sheet material, which consists in inserting one element in the opening in the other with the elastic material between them, thus causing the material overlying and closely surrounding the end of the inserted element to be stretched and forced into the other, thrusting a pointed tool through the exposed end of the outer element and into the underlying stretched elastic material so as to perforate the same and permit the part surrounding the perforation to be drawn back away from the inserted end of the inner element towards the plane of the surrounding body portion of the sheet material, and securing the two fastener elements together by pressing them towards each other in an axial direction between a pair of anvils so as to thrust the inserted element further into the outer element and thus cause the inserted end to be rolled into a clinching engagement with the outer element in the space surrounding the inserted end portion of the pointed tool.

3. The method of securing a pair of fastener elements of dimensions and form such that they may be loosely telescoped one within the other in accordance with claim 1 in which the elastic material overlying the exposed end of the inner element is punctured by being brought into contact with a downwardly projecting portion of the outer element.

JOSEPH W. DEWS.